P. WINTZ.
MOLDING MACHINE.
APPLICATION FILED AUG. 26, 1908.
1,000,474.
Patented Aug. 15, 1911.
3 SHEETS—SHEET 1.
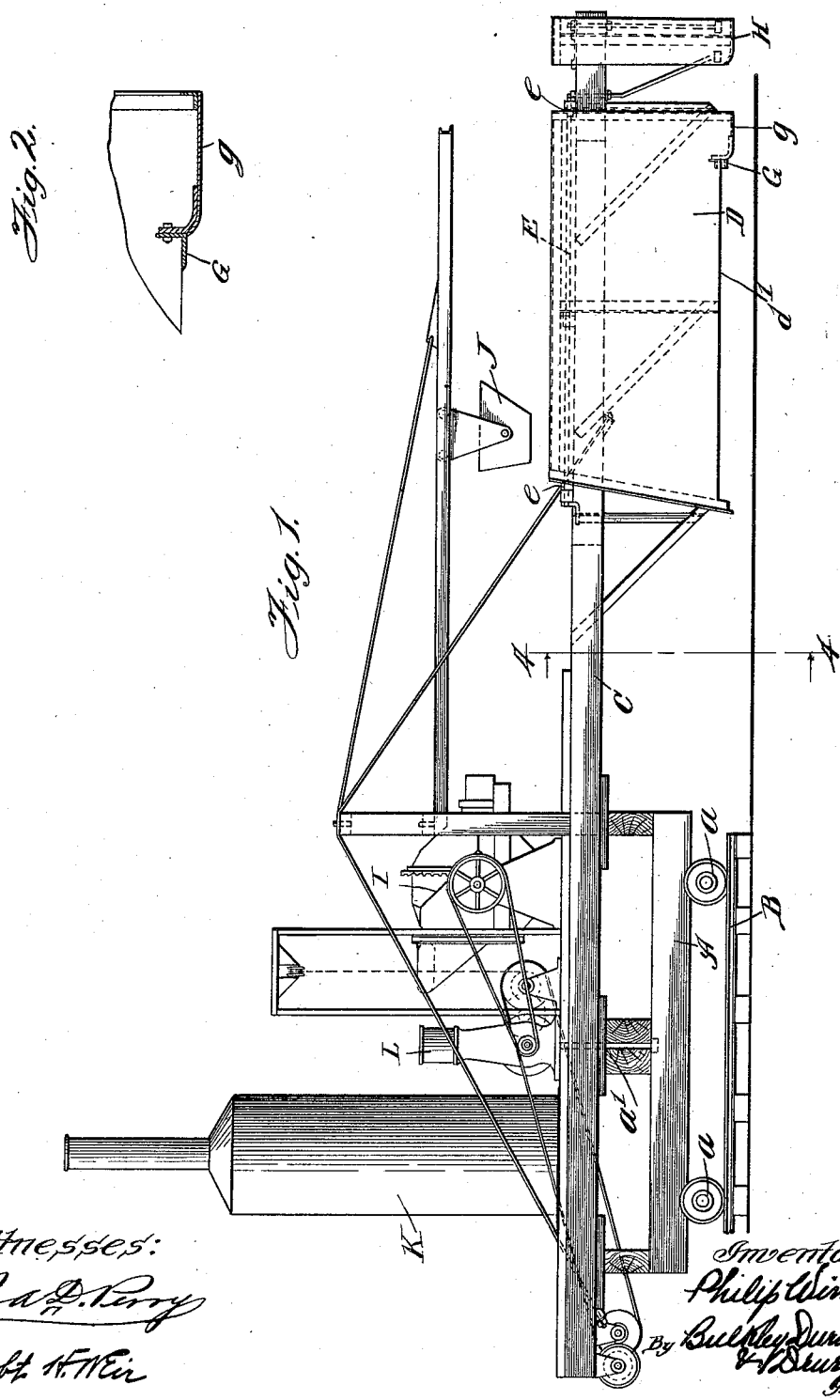

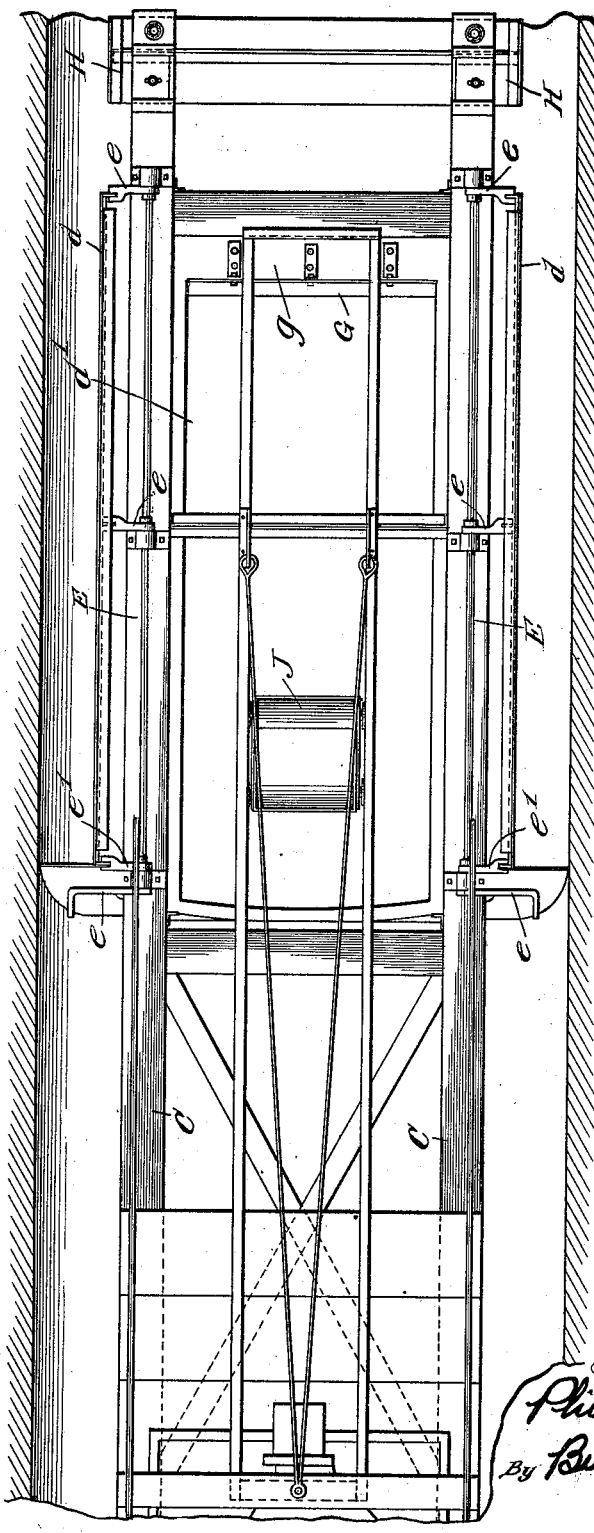

P. WINTZ.
MOLDING MACHINE.
APPLICATION FILED AUG. 26, 1908.
1,000,474.
Patented Aug. 15, 1911.
3 SHEETS—SHEET 3.
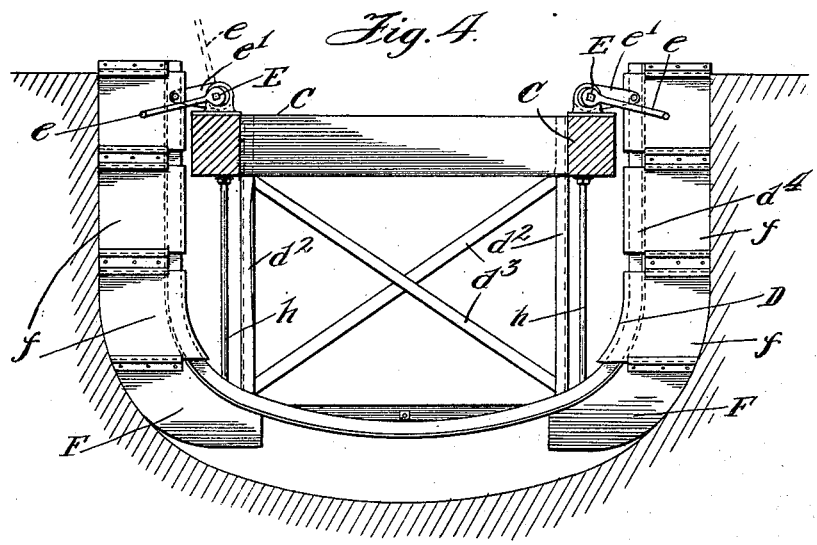
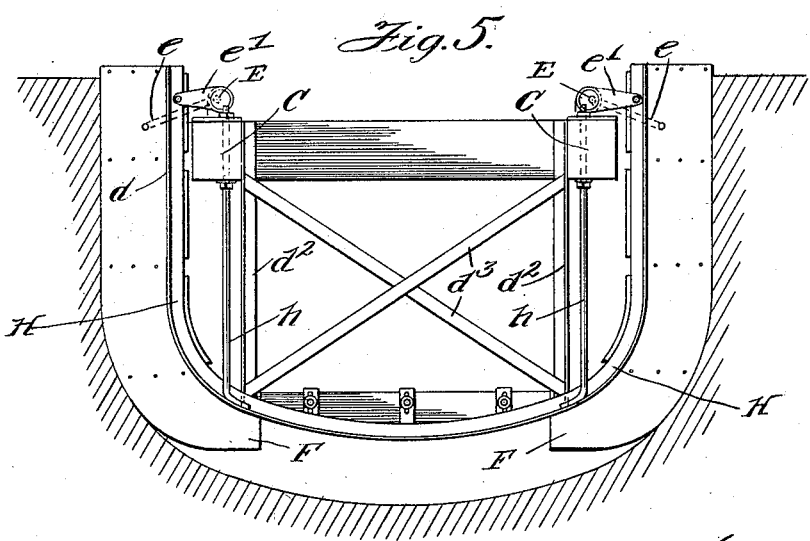
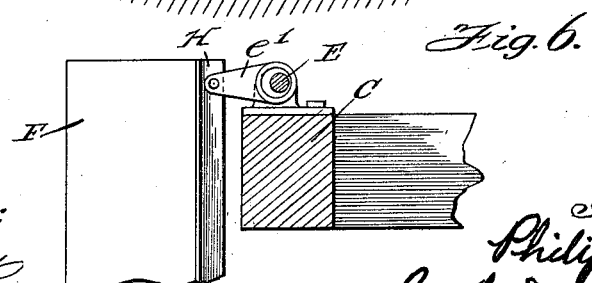

UNITED STATES PATENT OFFICE.

PHILIP WINTZ, OF BURBANK, CALIFORNIA.

MOLDING-MACHINE.

1,000,474.   Specification of Letters Patent.   Patented Aug. 15, 1911.

Application filed August 26, 1908. Serial No. 450,284.

*To all whom it may concern:*

Be it known that I, PHILIP WINTZ, a citizen of the United States of America, and resident of Burbank, Los Angeles county, California, have invented a certain new and useful Improvement in Molding-Machines, of which the following is a specification.

In the use of concrete and cement and other similar building materials, it frequently is necessary to mold the same into the desired shape, especially where it is to be used in the building of walls and conduits and other similar structures, all of which require a careful molding of the materials into certain arbitrary forms. It is very common, in work of this kind, to use lumber, in various ways, for keeping the cement or concrete in place until the same has hardened sufficiently to stand alone, and to then pull the lumber down and use it over again in the successive formation of different sections of the work. Also, it has been proposed to use molds made of metal plates that can be set up in place, into which the soft concrete or cement can be run or tamped to form the desired structure, and which can then be taken apart to leave the hardened material standing by itself. It will be seen, however, that these methods require a constant and continual building up and tearing down, with a consequent loss of time and waste of money and materials.

The object of my invention is, therefore, the provision of a mold that will do the required work without the necessity of tearing down or taking apart the elements thereof when the cement or concrete is hard, or sufficiently so to stand alone, and which can be released from the work by a simple adjustment or movement of the walls out of contact with the material, thus leaving the mold intact and in condition to be moved bodily to another position and used again in the same manner.

To this and other useful ends, my invention consists in matters hereinafter set forth and claimed.

In the accompanying drawings, Figure 1 is a side elevation of a combined concrete mixing plant and conduit mold embodying the principles of my invention. Fig. 2 is a detail sectional view of the knife or trimmer that smoothes the bottom of the conduit as the machine moves along. Fig. 3 is a plan of the machine shown in Fig. 1. Fig. 4 is an enlarged sectional cross section on line 4—4 in Fig. 1. Fig. 5 is a rear end elevation of the mold on the same scale as Fig. 4. Fig. 6 is a detail sectional view, on a still larger scale, showing one of the eccentric devices for adjusting the sides of the mold.

Thus illustrated, my invention comprises a body A having wheels $a$ adapted to run on rails B laid in the bottom of the trench dug for the conduit. The said body has a pair of rearwardly extending parallel beams C that carry the mold D, which latter is in the form of a short trough made U-shape in cross section. Sheet metal is used for the sides $d$, which are movable toward and away from each other, and for the bottom, there being a large opening $d'$ in the bottom through which the concrete can be dumped and then tamped down in place. The sheet metal is carried by vertical and cross braces $d^2$ and $d^3$, and by U-shaped inner ribs $d^4$, of angle iron or other suitable material, as shown more clearly in Fig. 4. A transverse cross beam $d^5$ connects the two beams C, and the latter support the said braces. Eccentric rods E are mounted on said beams C and provided with cranks $e$, the eccentric portions of said rods being connected by means of links $e'$ with the movable sides $d$, whereby the latter can be moved slightly toward and away from each other. The arrangement is such that the eccentrics are a little past the center when the sides are in position for molding, thus insuring a locking action sufficient to prevent the pressure of the concrete from throwing the walls inward. At its forward end the mold has a pair of lateral flanges F that form a sort of bulk head to stop the concrete, and which are provided with sliding plates $f$ that can be moved over against the sides of the trench to prevent the soft cement or concrete from escaping forward. The rivets for these flanges must not extend below the points in the two sides where the same begin to curve, for otherwise the flexibility of said sides would be interfered with. With this construction, the concrete can be dumped between the movable sides $d$ and the sides of the trench, and more can then be dumped through the bottom of the mold; and when the concrete is sufficiently hard the machine can be moved forward, but not until the cranks $e$ have been operated to pull the sides $d$ away from the concrete, the movement toward each other of the sides being possible by reason of the flexibility of the metal.

When the machine moves forward, the bottom of the conduit is trimmed by the knife G that is disposed horizontally across the mold at the rear edge of the opening $d'$ and a little above the bottom of the mold. The said knife is followed by the heel $g$ of the mold, and thus after the trimming the concrete is pressed down to the required level. A short distance in rear of the mold, and secured to the beams C, is a plasterer H which is also U-shaped in form, being supported in alinement with the mold by hangers $h$ attached to said beams. As the machine moves along, a workman can apply the plaster or finishing coat to the concrete through the space between the mold D and the plasterer H, and the latter then smoothes the surface when the machine is given another step forward. Such forward movement of the mold does not leave the fresh end of the conduit liable to fall away, as the front end of the mold inclines to the rear, as shown in Fig. 1, thus giving each batch of concrete a beveled or inclined end that will not fall down. Furthermore, this makes an end that can be chipped or broken in an effective way to insure a good union or joint with the next batch or fill of cement.

It will be understood, of course, that any suitable means can be employed for delivering the mixed concrete to the mold. As a matter of further and special improvement, however, I provide the car body A with a concrete mixer I, of any suitable or approved form, and deliver the concrete therefrom to the mold by means of a traveling bucket J constructed and operated in any suitable manner. A boiler K and engine L are also mounted on the platform of the car, so as to furnish the power for operating the mixer, as well as for moving the machine forward. The car has a center pin or pivot $a'$ that permits the platform and beams C to swing laterally, thus enabling the machine to turn a corner. As shown, the bucket J travels on ways $j$ that extend out rearwardly from the uprights $a^2$ of the car body, and which are mounted to swing sidewise, thereby enabling the bucket to deliver the concrete to all points of the mold. In this way the concrete mixing plant and the mold are all united and combined in a unitary and self-contained machine. The braces $d^2$ and $d^3$ hold the bottom of the mold in a rigid or stiff condition, but the sides can flex at or just above the points where the lower ends of the braces $d^2$ are joined thereto, thus insuring a hinge-like action for said sides.

It is obvious, of course, that the mold may be embodied in a separate machine by itself, and that the plasterer H may constitute another separate machine. Also, it will be seen that the details of construction can be varied more or less without departing from the principles of my invention. I do not, therefore, limit myself to the exact arrangement and construction shown and described.

It will be understood, of course, that the track B is laid in sections, and that each time the machine moves forward it is necessary to take up the section immediately in advance of the mold, which latter can be embodied in different forms and given different shapes, depending on the character of the work. As shown, it is used for making what is called the invert of a concrete conduit, but it may be given other shapes for other purposes, and for this reason the walls may be made to spring or move either outward or inward to release the mold from the concrete.

What I claim as my invention is:

1. In a machine of the class described, a mold made U-shape in cross section, provided with sides that are movable toward and away from each other, means for moving the walls toward each other to release them from the material molded outside thereof, and a wheeled frame traveling on the ground in advance of the mold to support the same for horizontal and endwise movement in the direction of the work, as set forth.

2. In a machine of the class described, a mold having inwardly and outwardly movable walls, means for moving the walls toward each other to release them from the material molded outside thereof, and a wheeled frame traveling on the ground in advance of the mold to support the same for horizontal and endwise movement in the direction of the work, as set forth.

3. In a machine of the class described, a mold provided with movable sides, means for moving said sides to release them from the material molded in contact therewith, and a wheeled frame traveling on the ground in advance of the mold to support the same for horizontal and endwise movement in the direction of the work, as set forth.

4. In a machine of the class described, a mold made U-shape in cross section, provided with sides that are movable toward and away from each other, means for moving the walls toward each other to release them from the material molded outside thereof, a concrete or cement mixing plant movable or portable with said mold and combined therewith to form a unitary and self-contained mixing and molding machine, and delivery means extending from said plant to said mold, said plant having a body upon the rear end of which said mold is supported.

5. In a machine of the class described, a mold having inwardly and outwardly movable walls, means for moving the walls toward each other to release them from the material molded outside thereof, a concrete or cement mixing plant movable or portable with the said mold and combined therewith to form a unitary and self-contained mixing and molding machine, and delivery means extending from said plant to said mold, said plant being disposed in front of the mold.

6. In a machine of the class described, a mold provided with movable sides, means for moving said walls to release them from the material molded in contact therewith, a concrete or cement mixing plant movable or portable with said mold and combined therewith to form a unitary and self-contained mixing and molding machine, and delivery means extending from said plant to said mold, said plant adapted to travel in the ditch with and ahead of the mold.

7. In a machine of the class described, a mold made U-shape in cross section, provided with sides that are movable toward and away from each other, a fixed or rigid lower member connecting said sides, means for moving the walls toward each other to release them from the material molded outside thereof, and a plasterer disposed in position to follow at a distance in rear of said mold.

8. In a machine of the class described, a sheet metal mold having inwardly and outwardly flexible walls, means for moving the walls toward each other to release them from the material molded outside thereof, means for moving the walls forward, after said walls are moved toward each other, and a plasterer disposed in position to follow at a distance in rear of said mold.

9. In a machine of the class described, a sheet metal mold provided with flexible sides, means for moving said sides transversely away from the material molded in contact therewith, means for moving the walls forward, after said walls are moved toward each other, and a plasterer disposed in position to follow at a distance in rear of said mold.

10. In a machine of the class described, a mold made U-shape in cross section, provided with sides that are movable toward and away from each other, means for moving the walls toward each other to release them from the material molded outside thereof, and means for moving the mold along endwise, said mold having an opening in its bottom through which the material to be molded can be dumped, each time the mold is moved forward, and united with similar material extending down at the sides of the mold.

11. In a machine of the class described, a mold having inwardly and outwardly movable walls, means for moving the walls toward each other to release them from the material molded outside thereof, and means for moving the mold along endwise, said mold having an opening in its bottom through which the material to be molded can be dumped, each time the mold is moved forward, and united with similar material extending down at the sides of the mold.

12. In a machine of the class described, a mold provided with movable sides, means for moving said sides away from the material molded in contact therewith, and means for moving the mold along endwise, said mold having an opening in its bottom through which the material to be molded can be dumped, each time the mold is moved forward, and united with similar material extending down at the sides of the mold.

13. In a machine of the class described, a mold made U-shape in cross section, provided with sides that are movable toward and away from each other, at their tops means for moving the walls toward each other to release them from the material molded outside thereof, and means for moving the mold along endwise, said mold being provided with a front end wall that inclines toward the rear end of the mold, for the purpose set forth.

14. In a machine of the class described, a mold having inwardly and outwardly movable walls, and means for moving the walls toward each other to release them from the material molded outside thereof, and means for moving the mold along endwise, said mold being provided with a front end wall that inclines toward the rear end of the mold, for the purpose set forth.

15. In a machine of the class described, a mold provided with movable sides, and means for moving said sides away from the material molded in contact therewith, and means for moving the mold along endwise, said mold being provided with a front end wall that inclines toward the rear end of the mold, for the purpose set forth.

16. In a machine of the class described, a mold made U-shape in cross section, provided with sides that are movable toward and away from each other, means for moving the walls toward each other to release them from the material molded outside thereof, said mold being provided with a trimmer, and with a heel adapted to follow said trimmer.

17. In a machine of the class described, a mold having inwardly and outwardly movable walls, means for moving the walls toward each other to release them from the material molded outside thereof, said mold being provided with a trimmer, and with a heel adapted to follow said trimmer.

18. In a machine of the class described, a mold provided with movable sides, means for moving said walls to release them from the material molded in contact therewith, said mold being provided with a trimmer, and with a heel adapted to follow said trimmer.

19. In a machine of the class described, a mold made U-shape in cross section, provided with sides that are movable toward and away from each other, means for moving the walls toward each other to release them from the material molded outside thereof, said mold provided with an opening in its bottom, and with a trimming knife at the rear edge of said opening.

20. In a machine of the class described, a mold having inwardly and outwardly movable walls, means for moving the walls toward each other to release them from the material molded outside thereof, said mold provided with a feed opening in its bottom, and with a trimming knife at the rear edge of said opening.

21. In a machine of the class described, a mold provided with movable sides, means for moving said walls to release them from the material molded in contact therewith, said mold provided with a feed opening in its bottom, and with a trimming knife at the rear edge of said opening.

22. In a machine of the class described, a mold made U-shape in cross section, provided with sides that are movable toward and away from each other at their upper edges, a fixed or rigid lower member connecting said sides, and means for moving the walls toward each other to release them from the material molded outside thereof, said mold provided with rotary eccentric rods connected for operating the movable portions of the mold.

23. In a machine of the class described, a mold having inwardly and outwardly movable walls, a rigid molding portion with which said walls are flexibly connected, and means for moving the walls toward each other to release them from the material molded outside thereof, said mold provided with rotary eccentric rods connected for operating the movable portions of the mold.

24. In a machine of the class described, a mold provided with movable sides, a rigid molding portion with which said walls are flexibly connected, and means for moving said sides to release them from the material molded in contact therewith, said mold provided with rotary eccentric rods connected for operating the movable portions of the mold.

25. In a machine of the class described, a mold made U-shape in cross section, provided with sides that are movable toward and away from each other, a molding portion to which the sides are flexibly connected, and means for moving the walls toward each other to release them from the material molded outside thereof, said mold having its forward end provided with laterally projecting plates for insuring against leakage of the material being molded, which plates are movable outwardly.

26. In a machine of the class described, a mold having inwardly and outwardly movable walls, and means for moving the walls toward each other to release them from the material molded outside thereof, said mold having its forward end provided with sliding plates carried by said movable walls for insuring against leakage of the material being molded, the rear end of the mold being open.

27. In a machine of the class described, a mold provided with movable sides, means for moving said sides to release them from the material molded in contact therewith, and a rigid molding portion to which said sides are flexibly connected, said mold having its forward end provided with sliding plates carried by said movable walls for insuring against leakage of the material being molded.

28. An apparatus for molding concrete work, comprising a traveling mold having a member with a substantially flat horizontally disposed molding surface and vertically disposed walls attached to the sides of such member, and traveling therewith as a part of the apparatus, the bottom of the mold being open, and said sides being flexible.

29. An apparatus for forming concrete work comprising a traveling mold having a feed opening for the reception of the body of the work, a top wall rearward of the feed opening to level off the body of the work, the mold having a second feed opening rearward of said top wall to receive the top finish of the work, a second top wall rearward of the second feed opening to smooth and trowel the top finish, and flexible sides.

30. An apparatus for molding concrete work, comprising a traveling mold having a member with a substantially flat horizontally disposed molding surface and vertically disposed walls attached to the sides of such member, and traveling therewith as a part of the apparatus, the bottom of the mold being open, a car traveling in front of said mold, to carry the same, and means on said car for mixing and delivering concrete to said mold.

31. An apparatus for forming concrete work, comprising a traveling mold having a feed opening for the reception of the body of the work, a top wall rearward of the feed opening to level off the body of the work, the mold having a second feed opening rearward to said top wall, to receive the top finish of the work, and a second top wall rearward of the second feed opening to smooth and trowel the top finish, a car traveling in front of said mold, to carry the same, and means on said car for mixing and delivering concrete to said mold.

32. An apparatus for forming concrete work, comprising a mold with flexible sides, adapted to move along in the ditch, and a car traveling in the ditch ahead of said mold to support the latter.

Signed by me at Chicago, Illinois this 15th day of August 1908.

PHILIP WINTZ.

Witnesses:
S. LEWIS,
C. E. TAYLOR.

Copies of this patent may be obtained for five cents each, by addressing the "Commissioner of Patents, Washington, D. C."